Jan. 1, 1924

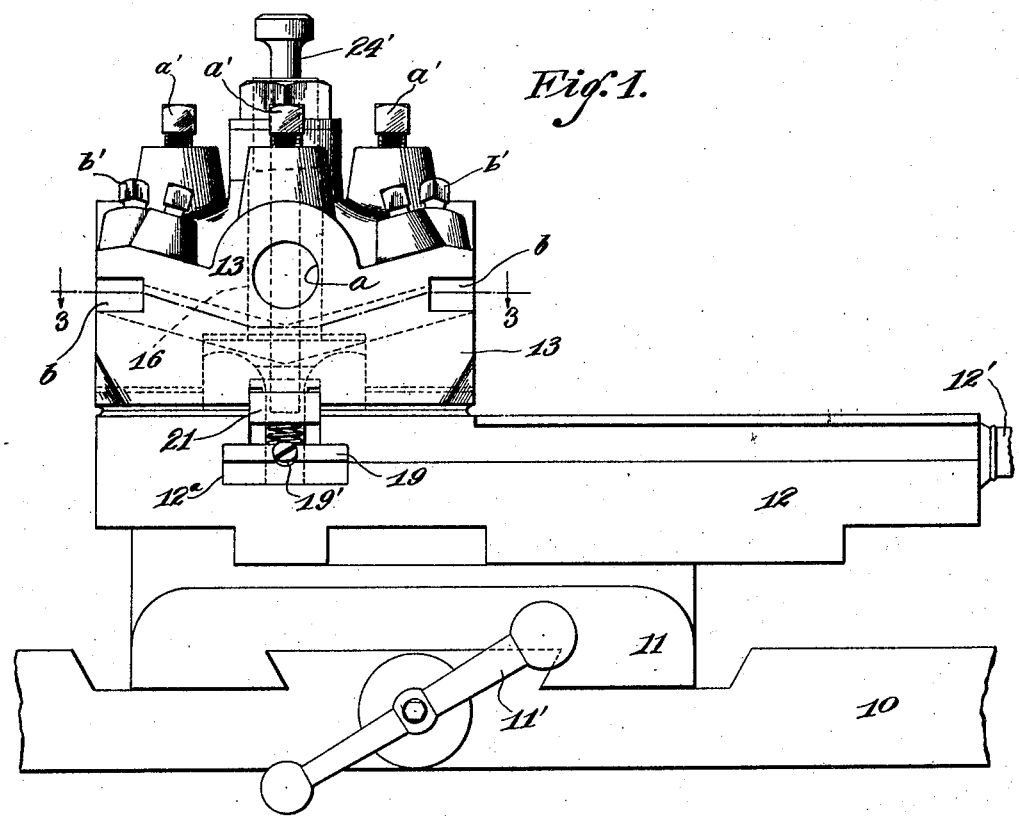
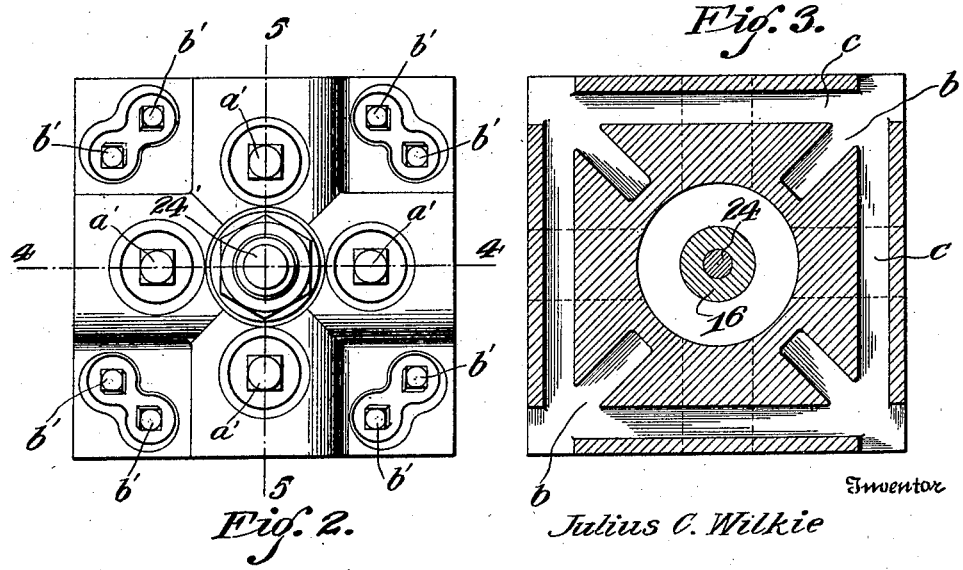

J. C. WILKIE

TOOL TURRET

Filed June 7, 1922

Inventor
Julius C. Wilkie

By Mason, Fenwick & Lawrence
Attorneys

Patented Jan. 1, 1924.

1,479,526

UNITED STATES PATENT OFFICE.

JULIUS C. WILKIE, OF WINONA, MINNESOTA.

TOOL TURRET.

Application filed June 7, 1922. Serial No. 566,653.

*To all whom it may concern:*

Be it known that I, JULIUS C. WILKIE, a citizen of the United States, residing at Winona, in the county of Winona and State of Minnesota, have invented certain new and useful Improvements in Tool Turrets; and I do hereby declare the following to be a full, clear, and exact description of the invention, such as will enable others skilled in the art to which it appertains to make and use the same.

This invention relates to turret tool posts and more particularly to a turret adapted to be used in connection with the conventional engine lathe.

It is an object of the invention to provide a turret that may be made as a separate article of manufacture, the turret to be used in place of the tool post forming part of the ordinary engine lathe.

The invention is embodied in a device having means adapted to be inserted into the tool post slot of the conventional tool carriage, said means including a post about which the turret may turn. The post is provided with a central bore through which is passed a stem for operating the turret locking means.

The above and other novel features of the invention will be fully described in connection with the two sheets of drawings forming part of this specification, and then set forth in the appended claims.

In the drawings which illustrate the preferred form of the invention,

Figure 1 shows the improved turret attached to the upper carriage of a compound tool carriage of an engine lathe;

Fig. 2 is a plan view of the turret;

Fig. 3 is a section on line 3—3 of Fig. 1;

Figure 4:
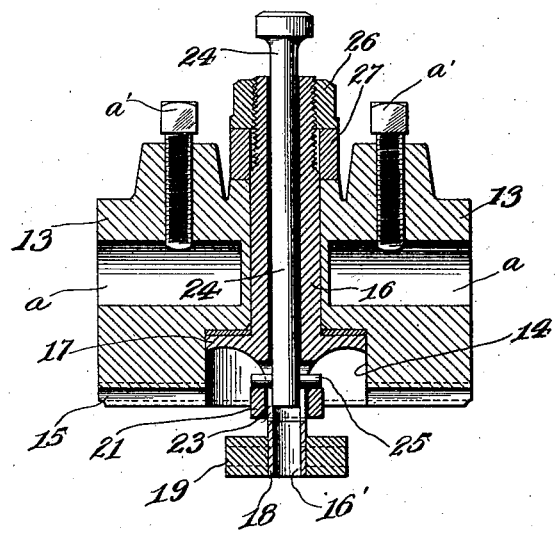
Fig. 4 is a vertical section on line 4—4 of Fig. 2.
Figure 5:
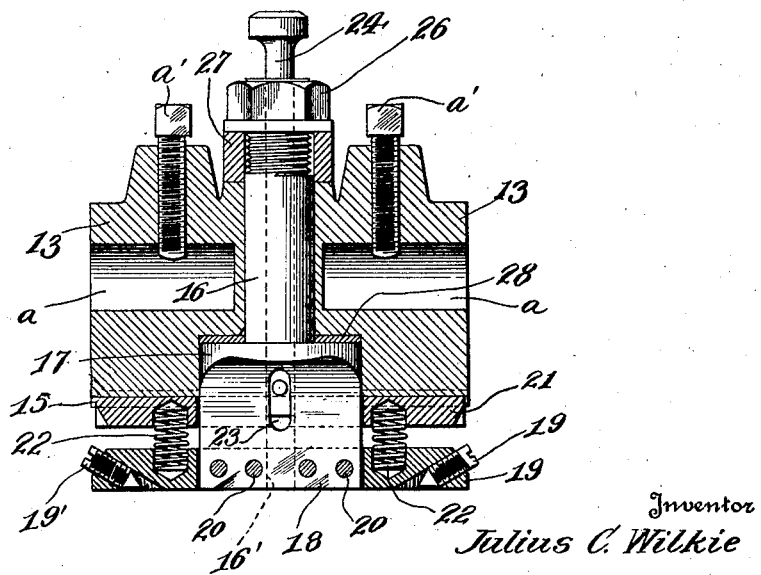
Fig. 5 is a vertical section on line 5—5 of Fig. 2.

In the drawings, 10 indicates the longitudinally movable main carriage of an engine lathe; 11 the transversely movable tool carriage; 12 the upper carriage which is rotatable on the carriage 11 about a vertical axis; 11′ the means for moving the carriage 11; and 12′ the means for moving the carriage 12. The above construction is conventional and forms merely the setting of my invention.

The tool-holding part of the turret is indicated at 13 and as shown may be provided with suitable bores and slots for the reception of various cutting tools. Thus there is a boring tool socket *a* at each side of the turret; inclined polygonal corner sockets *b* and inclined side sockets *c* (see Fig. 3). The set screws *a′* secure tools within the bores *a*, and the set screw *b′* secures tools within either the side sockets or corner sockets as will be readily understood.

The turret 13 is provided with a vertical bore and the lower face or bottom of the turret has a countersink 14 which is concentric with said bore. In the bottom face of the turret are one or more slots 15 for a purpose hereinafter mentioned. The turret is adapted to be rotatably mounted on a post 16 which has an enlarged body portion 17 which fits loose in the counterbore 14. This body, beginning at a point below its shoulder, is cut away on two sides to form a flat wing-like extension 18. Attached to this wing-like extension is a laterally or radially extending plate 19. Any suitable means for securing the two members 18 and 19 may be employed, as for example, pins or rivets 20 passing through said members. The plate 19 is preferably slotted intermediate its ends to receive the said extension 18. This plate 19 is adapted to enter the slot 12ᵃ of the tool carriage 12 as shown in Fig. 1. In order to take up play of the plate 19 in the slot 12ᵃ suitable take-up screws 19′ are provided in the ends of the plate, it being understood that the beveled ends of the screws will engage the bottom of the slot to raise the plate up into contact with the under face of the slot.

Mounted on the enlarged portion 17 of the post 16 is a key plate 21. This plate is slidably mounted on the wing-like extension 18 of the post and like the plate 19, is preferably slotted intermediate its ends to receive said extension. Inserted between the plate 19 and the key plate 21 are coil springs 22 which serve to press the key plate upwardly against the bottom face of the turret 13. As already pointed out, the bottom face of the turret is provided with a slot 15, there being a plurality of these slots. In the drawings only two such slots are shown, they being at right angles to each other; but the invention is not limited to the number of such slots. The key plate 21 is adapted to enter one of the slots 15 and thus lock the turret against rotation of the post 16.

Novel means are provided for displacing the key plate 21 from engagement with the key slot 15. The post 16 is provided with a central bore 16' extending therethrough. Adjacent the lower end of the post in the extension 18 is a slot 23. Within this bore is mounted a stem 24 having at its lower end a cross pin 25 projecting through said slot and overlying the two slot-walls of the key plate 21 as clearly shown in Fig. 4. When it is desired to disengage the key plate 21 from the key slot 15, the stem 24 is depressed and the key plate is moved toward the plate 19 against the tension of the springs 22. It will be understood that the springs 22 normally tend to maintain the key plate 21 within the key slot 15 or against the bottom face of the turret. By reference to Fig. 1, it will be seen that the key plate 21 is of sufficient depth to extend between the vertical walls of the tool post slot 12ª. This arrangement insures that the turret is positively locked against rotation with respect to the carriage 12.

The upper end of the post 16 is threaded to receive a locking nut 26 whereby the turret can be clamped to the tool carriage 12 as will be readily understood. A collar 27 is preferably provided between the nut and the turret; different height collars may be provided as may be needed to secure proper adjustment due to different sizes of tool post slots.

If desired, a felt washer 28 may be provided at the shoulder above portion 17 to facilitate lubrication of the parts.

The above described turret provides an attachment which may be readily used in connection with engine lathe having the conventional T-shaped slot for receiving the tool post. In assembling the invention into an engine lathe, it is merely necessary to remove the tool post and to bring the turret into place by sliding the plate 19 into the tool post slot. The slack-take-up screws 19' are then adjusted to bring the plate into engagement with the under side of the slot. It may be noted that after the plate 19 has been thus adjusted it is effectually held against sliding movement in the slot. When the operator desires to turn the turret it is merely necessary to first release the nut 26 somewhat and then to press downwardly on the stem 24 to displace the key plate 21 from the key slot 15. While the key plate is held in depressed position, the turret is rotated to the desired position whereupon the stem is released with the result that the key plate 21 is forced into engagement with the bottom face of the turret by the springs 22. If the key slot and key plate are not exactly aligned, it is merely necessary to rotate the turret until such alignment occurs whereupon the key plate 21 will snap into place as will be readily understood.

While I have described the invention with considerable particularity of detail, it is to be understood that no limitations are intended except as may be imposed by the appended claims.

What I claim is:

1. The combination of a tool turret having a vertical bore therethrough, a hollow post mounted in and extending through said bore, means projecting radially from the bottom of the post adapted to be entered into the slot of a tool carriage, means for locking said radially projecting means in said slot, means at the other end of the post for drawing said means toward the bottom of the turret, means for preventing relative rotation between the turret and said projecting means, said locking means comprising a key slidably mounted on said post and adapted to enter a slot in the bottom of the turret, and a stem in said post for displacing said key.

2. The combination of a tool turret having a vertical bore therethrough, a hollow post mounted in and extending through said bore, means projecting radially from the bottom of the post adapted to be entered into the slot of a tool carriage, means at the other end of the post for drawing said means toward the bottom of the turret, means for preventing relative rotation between the turret and said projecting means, said locking means comprising a key slidably mounted on the post adjacent said radially projecting means, spring means between the projecting means and key, and a key-operating stem within the post, and a fulcrum connection between said stem and key.

3. The combination of a tool turret having a vertical bore therethrough, a hollow post mounted in and extending through said bore, means projecting radially from the bottom of the post adapted to be entered into the slot of a tool carriage, means at the other end of the post for drawing said means toward the bottom of the turret post comprising a key plate non-rotatively mounted on the post between the bottom of the turret and said projecting means, said plate having means cooperating with the plate to prevent relative rotation therebetween, and means mounted in the post for displacing the key plate from cooperative engagement with the turret.

4. The combination of a hollow post having a transversely-extending head at one end, a stem in said post and projecting from the open end thereof, a pin and slot connection between the stem and the post adjacent the head thereof, the pin being carried by the stem, a key plate slidably mounted on the post between the pin and head.

5. The combination as in claim 4, and a tool-supporting member rotatably mounted on said post, said member having means for locking engagement with the key plate.

6. The combination as in claim 4, and cushion means tending to separate the key plate and head.

In testimony whereof I affix my signature.

JULIUS C. WILKIE.